United States Patent
Abel et al.

(10) Patent No.: US 8,483,266 B2
(45) Date of Patent: Jul. 9, 2013

(54) METHODS AND APPARATUS FOR ADAPTATION OF CONTINUOUS TIME-DECISION FEEDBACK EQUALIZERS WITH PROGRAMMABLE ADAPTATION PATTERNS

(75) Inventors: Christopher J. Abel, Coplay, PA (US); Lane A. Smith, Easton, PA (US); Philip N. Jenkins, Eden Prairie, MN (US); Brett D. Hardy, Chaska, MN (US); Vladimir Sindalovsky, Perkasie, PA (US)

(73) Assignee: LSI Corporation, San Jose, CA (US)

( * ) Notice: Subject to any disclaimer, the term of this patent is extended or adjusted under 35 U.S.C. 154(b) by 324 days.

(21) Appl. No.: 12/847,700

(22) Filed: Jul. 30, 2010

(65) Prior Publication Data

US 2012/0027073 A1 Feb. 2, 2012

(51) Int. Cl.
*H03K 5/159* (2006.01)
(52) U.S. Cl.
USPC ........................................................... 375/233
(58) Field of Classification Search
USPC ................. 375/232–233, 340, 342, 346, 350, 375/360, 368
See application file for complete search history.

(56) References Cited

U.S. PATENT DOCUMENTS

| | | | |
|---|---|---|---|
| 6,038,266 A | 3/2000 | Lee et al. | |
| 7,542,508 B2 * | 6/2009 | Marlett et al. | 375/233 |
| 7,623,600 B2 | 11/2009 | Momtaz et al. | |
| 8,325,793 B2 * | 12/2012 | Zhong | 375/233 |
| 2006/0239341 A1 * | 10/2006 | Marlett et al. | 375/233 |
| 2008/0069191 A1 * | 3/2008 | Dong et al. | 375/219 |
| 2008/0247452 A1 | 10/2008 | Lee | |
| 2008/0304559 A1 * | 12/2008 | Wu et al. | 375/233 |
| 2009/0046787 A1 * | 2/2009 | Uesugi et al. | 375/260 |
| 2009/0086807 A1 | 4/2009 | Aziz et al. | |
| 2010/0027606 A1 * | 2/2010 | Dai et al. | 375/232 |
| 2010/0046598 A1 | 2/2010 | Zhong et al. | |
| 2010/0128828 A1 | 5/2010 | Mobin et al. | |
| 2010/0150221 A1 | 6/2010 | Jenkins et al. | |
| 2012/0076181 A1 * | 3/2012 | Aziz et al. | 375/219 |

* cited by examiner

*Primary Examiner* — Khanh C Tran
(74) *Attorney, Agent, or Firm* — Ryan, Mason & Lewis, LLP

(57) ABSTRACT

Methods and apparatus are provided for adaptation of continuous time-decision feedback equalizers with programmable adaptation patterns. A continuous time-decision feedback equalizer is adapted by obtaining at least one programmable signature pattern that triggers adaptation of one or more of a pole and a gain of the continuous time-decision feedback equalizer; detecting the at least one programmable signature pattern in an incoming signal; and adapting one or more of the pole and the gain of the continuous time-decision feedback equalizer when the at least one programmable signature pattern is detected in the incoming signal. The programmable signature pattern can be selected to ensure an unambiguous direction of change in an error sample when a corresponding one of the pole and the gain are modified.

25 Claims, 4 Drawing Sheets

FIG. 5

| $X_{n-4}$ | $X_{n-3}$ | $X_{n-2}$ | $X_{n-1}$ | $e_n$ | $X_n$ | POLE UP(1) DN(−1) | GAIN UP(1) DN(−1) |
|---|---|---|---|---|---|---|---|
| 1 | 1 | 0 | 0 | 0 | 1 | 1 | 1 |
| 1 | 1 | 0 | 0 | 1 | 1 | −1 | −1 |
| 0 | 0 | 1 | 1 | 1 | 0 | 1 | 1 |
| 0 | 0 | 1 | 1 | 0 | 0 | −1 | −1 |
| * | * | 0 | 0 | 0 | 1 | — | 1 |
| * | * | 0 | 0 | 1 | 1 | — | −1 |
| * | * | 1 | 1 | 1 | 0 | — | 1 |
| * | * | 1 | 1 | 0 | 0 | — | −1 |
| OTHERS | | | | | | 0 | 0 |

500

METHODS AND APPARATUS FOR ADAPTATION OF CONTINUOUS TIME-DECISION FEEDBACK EQUALIZERS WITH PROGRAMMABLE ADAPTATION PATTERNS

FIELD OF THE INVENTION

The present invention relates generally to decision-feedback equalization techniques, and more particularly, to techniques for adaptation of continuous time decision-feedback equalizers using programmable adaptation patterns.

BACKGROUND OF THE INVENTION

Digital communication receivers must sample an analog waveform and then reliably detect the sampled data. Signals arriving at a receiver are typically corrupted by intersymbol interference (ISI), crosstalk, echo and other noise. Generally, intersymbol interference is caused by variations in group delay through the connection media, which is a function of the transmitted data pattern. This causes the data eye to be closed in the horizontal direction (timing wise) and vertical direction (amplitude attenuation of the serial data at the CDR input).

In order to mitigate these impairments, typical communication receivers contain arrangements for linear equalization or decision feedback equalization (or both). Linear equalization is a feed forward equalization that typically provides for amplification and high pass filtering of the incoming serial data. Decision feedback equalization (DFE) is a widely-used technique for removing intersymbol interference and other correlated noise. For a detailed discussion of decision feedback equalizers, see, for example, R. Gitlin et al., Digital Communication Principles, (Plenum Press 1992) and E. A. Lee and D. G. Messerschmitt, Digital Communications, (Kluwer Academic Press, 1988), each incorporated by reference herein. Generally, decision-feedback equalization utilizes a nonlinear equalizer to equalize the channel using a feedback loop based on previously received symbols.

U.S. patent application Ser. No. 12/600,749, to Philip Jenkins et al. and entitled "Continuous Time-Decision Feedback Equalizer," incorporated by reference herein, discloses a Continuous Time-Decision Feedback Equalizer (CT-DFE) that provides for serial data correction based on the history of the previously received data. In this manner, the disclosed CT-DFE compensates for intersymbol interference.

Generally, CT-DFEs aim to remove post-cursor ISI by using proper pole and gain values to compensate for the channel ISI. Existing CT-DFE adaptation methods use one or more predefined fixed patterns for the pole and gain adaptation. These predefined patterns cannot be changed to a pattern outside of the predefined set. Such fixed adaptation patterns, however, may lead to inferior adaptation results in some applications and in particular adaptation ranges. For example, the contribution from different samples through the CT-DFE feedback path to the error (transition sample as discussed below) may change sign. In addition, at the time of adaptation, some of the patterns may not be available in the incoming data or their frequency of occurrences may be too low.

A need therefore exists for improved CT-DFE adaptation methods and apparatus that employ programmable adaptation patterns for gain and pole settings.

SUMMARY OF THE INVENTION

Generally, methods and apparatus are provided for adaptation of continuous time-decision feedback equalizers with programmable adaptation patterns. According to one aspect of the invention, a continuous time-decision feedback equalizer is adapted by obtaining at least one programmable signature pattern that triggers adaptation of one or more of a pole and a gain of the continuous time-decision feedback equalizer; detecting the at least one programmable signature pattern in an incoming signal; and adapting one or more of the pole and the gain of the continuous time-decision feedback equalizer when the at least one programmable signature pattern is detected in the incoming signal.

In one exemplary embodiment, the detecting step employs one or more of data and transition latches to capture one or more of data and error samples. The error sample can be, for example, a transition sample between transitioning data samples.

The programmable signature pattern can be selected to ensure an unambiguous direction of change in an error sample when a corresponding one of the pole and the gain are modified. The programmable signature pattern can optionally be obtained from a memory. According to a further aspect of the invention, the detecting step can only considers bits of the programmable signature pattern that have not been masked. A signal integrity check can optionally ensure a transition sample between two transitioning data samples is equal to one of the two transitioning data samples.

A more complete understanding of the present invention, as well as further features and advantages of the present invention, will be obtained by reference to the following detailed description and drawings.

BRIEF DESCRIPTION OF THE DRAWINGS

FIG. 5 illustrates an exemplary adaptation truth table for the gain and pole adaptation patterns of FIG. 3.

DETAILED DESCRIPTION

The present invention provides methods and apparatus for adaptation of Continuous Time-Decision Feedback Equalizers (CT-DFEs). The present invention allows the adaptation patterns to vary for different applications or different ranges of adaptation (or both). The flexibility of adaptation patterns provided by the present invention allows the adaptation results to be improved.

Figure 1:
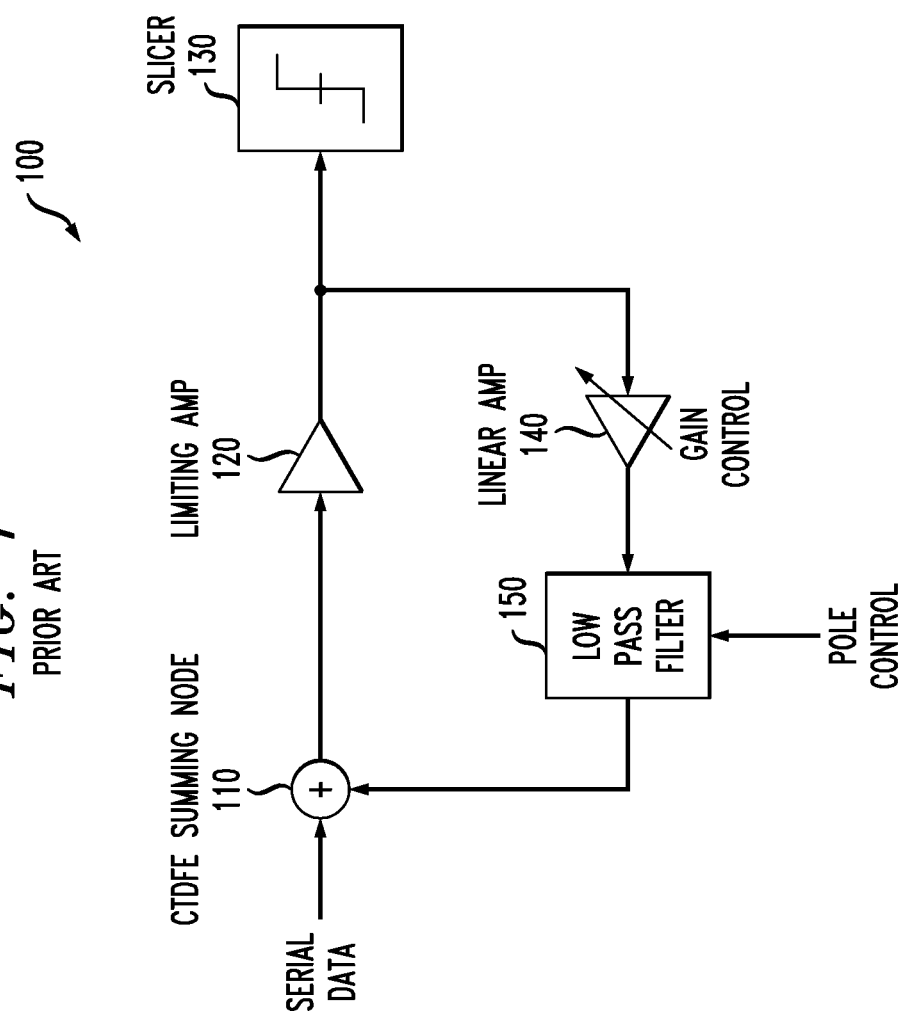
FIG. 1 is a block diagram of an exemplary conventional CT-DFE.

FIG. 1 is a block diagram of an exemplary conventional CT-DFE 100. As shown in FIG. 1, the exemplary CT-DFE 100 comprises a summing node 110, a limiting amplifier 120, a slicer 130, a linear amplifier 140 and a low pass filter 150. As previously indicated, CT-DFEs aim to remove post-cursor ISI by using proper pole and gain control values to compensate for the channel ISI. The slicer 130 performs bit or symbol detection, in a known manner.

The summing node 110 receives an input from an incoming serial data signal and receives an output from the low pass filter 150. The summing node 110 typically subtracts the output from the low pass filter 150 from the incoming signal, resulting in a net signal with less distortion in attempting to reconstruct the original signal. The limiting amplifier 120 will decide whether the pulse signals within the incoming serial data signal represent either a digital "1" or a digital "0". The limiting amplifier 120 can be based, for example, on an operational-amplifier or another circuit combination that can decide whether or not an input is a digital "1" or "0".

The limiting amplifier 120 sends a quantized digital "1" or "0" to the linear amplifier 140 in a feedback path, and also to the slicer 130. The feedback path also includes the low pass filter 150. The linear amplifier 140 amplifies the quantized digital values based on the adapted gain control value and the low pass filter 150 filters the amplified quantized digital values based on the adapted pole control value. For a more detailed discussion of a suitable conventional adaptation method, see, for example, U.S. patent application Ser. No. 12/600,749, to Philip Jenkins et al. and entitled "Continuous Time-Decision Feedback Equalizer," incorporated by reference herein, CT-DFE Adaptation with Programmable Patterns As previously indicated, existing CT-DFE adaptation methods use one or more predefined fixed patterns for the pole and gain adaptation. The present invention recognizes that such fixed adaptation patterns may lead to inferior adaptation results in some applications and in particular adaptation ranges.

According to one aspect of the present invention, a CT-DFE adaptation method is provided that uses programmable adaptation patterns for the pole and gain adaptation. The exemplary CT-DFE adaptation method provides CT-DFE adaptation based on horizontal eye monitoring. In other words, the disclosed adaptation algorithm adapts the CT-DFE gain and pole parameters in such a way that effectively minimizes the horizontal (timing) spread of the transition zero crossings. In one exemplary embodiment, the pole and gain control settings are adapted to the incoming serial data using transition and data latches to collect error and data samples. For a more detailed discussion of exemplary techniques for sampling an incoming signal using transition and data latches, see, for example, U.S. patent application Ser. No. 11/864,110, entitled "Methods and Apparatus for Determining Threshold of One or More DFE Transition Latches Based on Incoming Data Eye," assigned to the assigned of the present invention and incorporated by reference herein.

Generally, the adaptation proceeds by adjusting (adapting) the pole and gain in a direction that minimizes the correlation between the error sample and some combination of prior data samples. The particular data sample sequence is chosen such that the known gain and frequency characteristics of the CT-DFE feedback path of FIG. 1, will have an unambiguous effect on the error samples. In this manner, the adaptation process will converge to the best values of gain and pole, thereby enhancing the data eye seen by the slicer.

Figure 2:
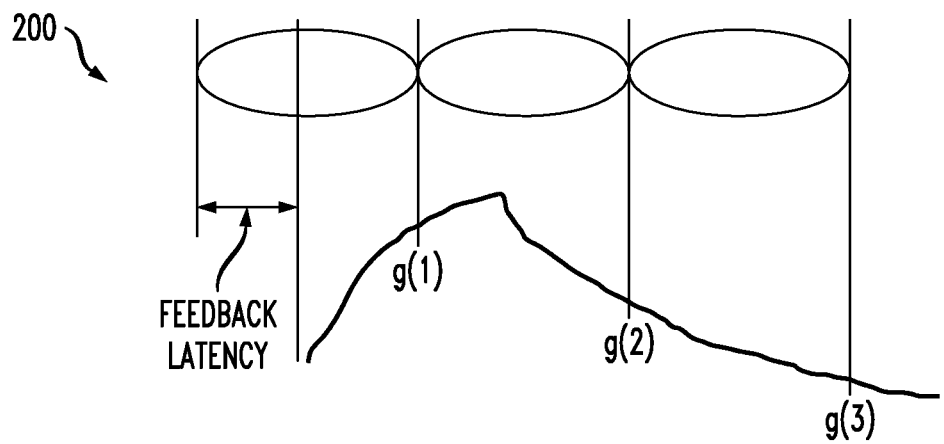
FIG. 2 illustrates the pulse response for the CT-DFE of FIG. 1.

FIG. 2 illustrates the pulse response 200 for the CT-DFE 100 of FIG. 1, with taps g(1), g(2) and g(3). Generally, the pulse response 200 describes the impact that a single feedback pulse has on subsequent data samples. The impact of all previous data samples through the feedback path of the CT-DFE 100 onto the current data sample can be described by superposition of the corresponding pulse responses from the previous samples, in a known manner. The sign (or direction) of this contribution depends on each previous sample being a "1" or a "0". The desire to have an unambiguous impact of the adaptation decision on the sign of the error leads to a particular choice in the adaptation patterns which are taken into consideration during adaptation. In other words, an analysis of the pulse response 200 can be employed to determine the best patterns to be employed for adaptation. The pulse response 200 may change over time, for example, due to PVT considerations. Thus, the programmable adaptation patterns of the present invention can allow the adaptation patterns to be modified as the pulse response 200 changes.

Figure 3:
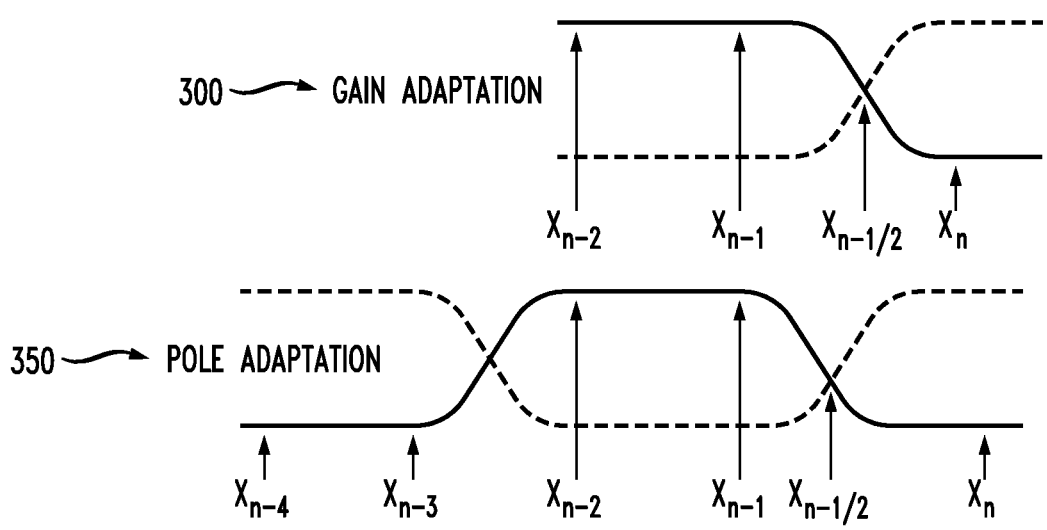
FIG. 3 is a timing diagram for exemplary patterns for adapting the gain and pole parameters of the exemplary CT-DFE of FIG. 1.

FIG. 3 is a timing diagram for exemplary patterns 300, 350 for adapting the gain and pole parameters, respectively, of the exemplary CT-DFE 100 of FIG. 1. The exemplary adaptation patterns 300, 350 are defined by the amplitude and frequency characteristics of feedback path of the CT-DFE 100. For one exemplary CT-DFE design, the gain adaptation patterns 300 were fixed patterns of "110" and "001". FIG. 3 illustrates an exemplary gain pattern of 110, corresponding to data samples of $X_{n-2}X_{n-1}X_n$ and a transition sample of $X_{n-1/2}$. Thus, gain adaptation occurred on each data sample transition if the two prior data samples $(X_{n-2}X_{n-1})$ were the same binary value, with the error sample being the transition sample $(X_{n-1/2})$ between the transitioning data samples $(X_{n-1}X_n)$. For the exemplary channels under consideration, these two consecutive and equal samples before the transition guaranteed the direction of change in the error sample when gain control is adjusted during gain adaptation.

In a similar manner, as shown in FIG. 3, the fixed pole adaptation patterns 350 were "00110" and "11001" which meant that that pole adaptation occurred on each data sample transition if the two prior data samples $(X_{n-2}X_{n-1})$ were the same and opposite in sign to both the third and fourth prior data samples $(X_{n-4}X_{n-3})$. It was found that for the majority of pole control values, the error sign contribution of data samples $X_{n-1}$, and $X_{n-2}$ is opposite to the contribution of data samples $X_{n-3}$ and $X_{1-4}$. Thus, "00110" and "11001" patterns have been chosen for pole adaptation to provide unambiguous change in the error sample (Xn−1/2) when pole control is adjusted during adaptation.

Figure 4:
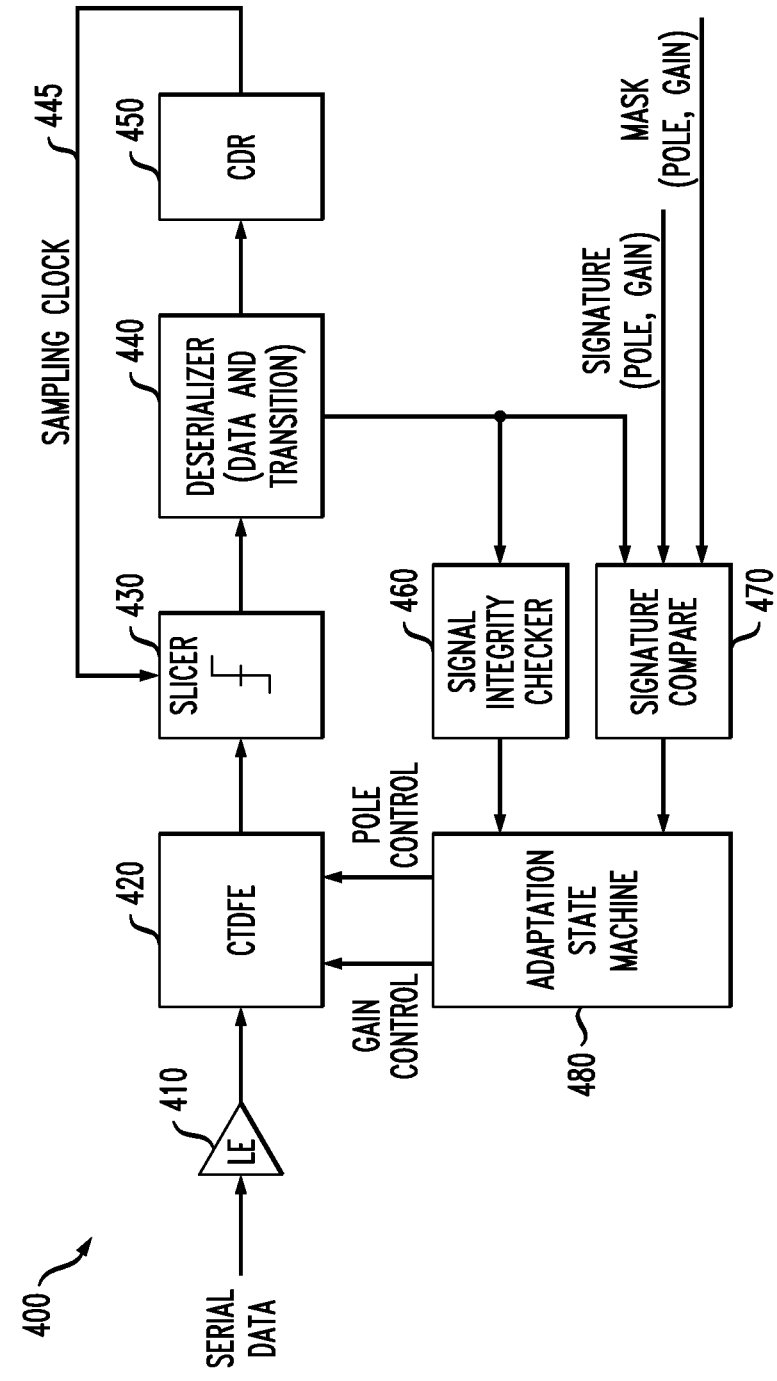
FIG. 4 is a block diagram of an exemplary CT-DFE that incorporates programmable adaptation patterns in accordance with the present invention.

FIG. 4 is a block diagram of an exemplary CT-DFE 400 that incorporates programmable adaptation patterns in accordance with the present invention. As shown in FIG. 4, the input serial data initially is applied to an optional linear equalizer (LE) 410. The serial data is then applied to a CT-DFE block 420, which may be implemented in a similar manner to the CT-DFE 100 of FIG. 1. The output of the CT-DFE block 420 is captured in data and transition slicers 430. The data and transition slicers 430 obtain their sampling clock 445 from a CDR 450. The sampled data is deserialized in the deserializer block 440 and applied to a signal integrity checker 460 and signature compare block 470.

The signature compare block 470 compares the data to a predefined signature pattern and mask. The signature pattern and mask are provided, for example, from a memory, which can be modified at any time and thereby change the data pattern used for adaptation. Assume that the signature and mask are six bits wide and provided separately for gain and pole. Unmasked bits of each signature pattern are compared by the signature compare block 470 to the deserialized signal, and in the case of being equal (or complementary), allow for the error bit to be considered by the adaptation state machine 480 and eventually influence gain and pole controls of the CTDFE 420.

The signal integrity checker 460 checks for the transition samples between each two adjacent data samples to ensure they are equal to one of the two data samples. Thus, if the two adjacent samples are "1," then the transition sample also should be a "1" and vice versa. In this manner, this prevents adaptation to the data if the CDR 450 looses (or has not yet acquired) lock to the incoming serial data.

FIG. 5 illustrates an exemplary adaptation truth table for the gain and pole adaptation patterns 300, 350 of FIG. 3. To comply with the exemplary gain adaptation pattern 300 of FIG. 3, the gain signature pattern should be "000011" and the gain mask should be "000011". Likewise, to comply with the exemplary pole adaptation pattern 350 of FIG. 3, the pole signature pattern should be "000011" and the pole mask should "001111".

The gain adaptation will take place for the exemplary gain pattern "11" changing to "0" or "00" changing to "1" with error bit (transition sample) having opposite effect in these two cases, in the manner discussed above. The pole adaptation will take place for an exemplary pattern of "0011" changing to "0" or a pattern of "1100" changing to "1", as shown in FIG. 5.

It is noted that adaptation can optionally be performed during a training phase, for example, with the transmitter and receiver agreeing on the adaptation patterns. In addition, when there is sufficient randomization in the data pattern, adaptation can be triggered only when a predefined gain or pole pattern is encountered.

The examples shown herein are for a one tap CT-DFE only. This entire architecture can be extended with more complexity to additional CT-DFE taps, as would be apparent to a person of ordinary skill in the art.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention.

We claim:

1. An adaptation method for a continuous time-decision feedback equalizer, wherein said continuous time-decision feedback equalizer comprises an amplifier controlled by a gain control value and a filter controlled by a pole control value, said adaptation method comprising:

obtaining at least one programmable signature pattern that triggers adaptation of one or more of said gain control value and said pole control value of said continuous time-decision feedback equalizer;

detecting said at least one programmable signature pattern in an incoming signal; and adapting one or more of said pole control value and said gain control value of said continuous time-decision feedback equalizer when said at least one programmable signature pattern is detected in said incoming signal.

2. The method of claim 1, wherein said detecting step employs one or more of data and transition latches to capture one or more of data and error samples.

3. The method of claim 2, wherein said error sample is a transition sample between transitioning data samples.

4. The method of claim 1, wherein said at least one programmable signature pattern is selected to ensure an unambiguous direction of change in an error sample when a corresponding one of said pole and said gain are modified.

5. The method of claim 1, wherein said at least one programmable signature pattern is obtained from a memory.

6. The method of claim 1, wherein said detecting step only considers bits of said at least one programmable signature pattern that have not been masked.

7. The method of claim 1, further comprising the step ensuring a transition sample between two transitioning data samples is equal to one of said two transitioning data samples.

8. A continuous time-decision feedback equalizer, comprising:

a feedback filter comprising an amplifier controlled by a gain control value and a filter controlled by a pole control value; and means for adapting at least one of said gain control value and said pole control value when at least one programmable signature pattern is detected in said incoming signal.

9. The continuous time-decision feedback equalizer of claim 8, wherein said at least one programmable signature pattern is detected using one or more of data and transition latches to capture one or more of data and error samples.

10. The continuous time-decision feedback equalizer of claim 9, wherein said error sample is a transition sample between transitioning data samples.

11. The continuous time-decision feedback equalizer of claim 8, wherein said at least one programmable signature pattern is selected to ensure an unambiguous direction of change in an error sample when a corresponding one of said pole and said gain are modified.

12. The continuous time-decision feedback equalizer of claim 8, wherein said at least one programmable signature pattern is obtained from a memory.

13. The continuous time-decision feedback equalizer of claim 8, wherein only bits of said at least one programmable signature pattern are considered that have not been masked.

14. The continuous time-decision feedback equalizer of claim 8, further comprising a signal integrity block to ensure a transition sample between two transitioning data samples is equal to one of said two transitioning data samples.

15. The continuous time-decision feedback equalizer of claim 8, wherein means for adapting comprises an adaptation state machine.

16. The continuous time-decision feedback equalizer of claim 8, wherein means for adapting comprises an adaptation process.

17. A communications receiver for receiving a received signal, comprising:

a continuous time-decision feedback equalizer, comprising:

a feedback filter comprising an amplifier controlled by a gain control value and a filter controlled by a pole control value; and means for adapting at least one of said gain control value and said pole control value when at least one programmable signature pattern is detected in said incoming signal.

18. The communications receiver of claim 17, wherein said at least one programmable signature pattern is detected using one or more of data and transition latches to capture one or more of data and error samples.

19. The communications receiver of claim 18, wherein said error sample is a transition sample between transitioning data samples.

20. The communications receiver of claim 17, wherein said at least one programmable signature pattern is selected to ensure an unambiguous direction of change in an error sample when a corresponding one of said pole and said gain are modified.

21. The communications receiver of claim 17, wherein said at least one programmable signature pattern is obtained from a memory.

22. The communications receiver of claim 17, wherein only bits of said at least one programmable signature pattern are considered that have not been masked.

23. The communications receiver of claim 17, further comprising a signal integrity block to ensure a transition sample between two transitioning data samples is equal to one of said two transitioning data samples.

24. The communications receiver of claim 17, wherein means for adapting comprises an adaptation state machine.

25. The communications receiver of claim 17, wherein means for adapting comprises an adaptation process.

* * * * *